United States Patent
Wu

(10) Patent No.: US 8,517,391 B2
(45) Date of Patent: Aug. 27, 2013

(54) HYDRAULIC CHUCK ASSEMBLY

(76) Inventor: Hsuan-Lung Wu, Taichung (TW)

( * ) Notice: Subject to any disclaimer, the term of this patent is extended or adjusted under 35 U.S.C. 154(b) by 627 days.

(21) Appl. No.: 12/839,150

(22) Filed: Jul. 19, 2010

(65) Prior Publication Data

US 2012/0013080 A1   Jan. 19, 2012

(51) Int. Cl.
*B23B 31/20* (2006.01)
*B23B 31/30* (2006.01)

(52) U.S. Cl.
USPC ............................ 279/4.09; 279/4.07; 279/50

(58) Field of Classification Search
USPC ............. 279/4.09, 4.07, 50, 43, 4.01, 4.06
See application file for complete search history.

(56) References Cited

U.S. PATENT DOCUMENTS

| | | | | |
|---|---|---|---|---|
| 3,771,803 A | * | 11/1973 | Hiestand | 279/4.01 |
| 3,922,952 A | * | 12/1975 | Roddy et al. | 91/29 |
| 4,296,658 A | * | 10/1981 | Champeau et al. | 82/147 |
| 4,537,410 A | * | 8/1985 | Hiestand | 279/4.01 |
| 6,668,859 B1 | * | 12/2003 | Wu | 137/580 |
| 2002/0053771 A1 | * | 5/2002 | Wu | 279/4.07 |
| 2005/0040608 A1 | * | 2/2005 | Wu | 279/4.07 |

FOREIGN PATENT DOCUMENTS

| | | | |
|---|---|---|---|
| JP | 61038841 A | * | 2/1986 |
| JP | 03086410 A | * | 4/1991 |

* cited by examiner

*Primary Examiner* — Eric A Gates
*Assistant Examiner* — Chwen-Wei Su
(74) *Attorney, Agent, or Firm* — Abelman, Frayne & Schwab

(57) ABSTRACT

A hydraulic chuck assembly for a tool machine includes first and second valve units disposed to control flow of pressurized fluids into a cylindrical chamber so as to move an annular piston to thereby move a taper socket along a spindle axis. Each valve unit includes a ball movable along a valve axis radial to the spindle axis such that the ball can be further forced to abut firmly against a valve seat during a high-speed rotation. Oil leakage can be prevented to ensure firm engagement of a workpiece with a collet head.

6 Claims, 11 Drawing Sheets

HYDRAULIC CHUCK ASSEMBLY

BACKGROUND OF THE INVENTION

1. Field of the Invention

This invention relates to a hydraulic chuck assembly for a tool machine, more particularly to a hydraulic chuck assembly with valve units to control flowing of pressurized fluids to move a piston between releasing and tightening positions.

2. Description of the Related Art

Referring to FIGS. 1 and 2, a conventional chuck assembly 10 disclosed in U.S. Pat. No. 6,668,859 is shown to include a housing 11, a mount 12, a valve sleeve 13, a valve unit 15, a bearing unit 16, a rotary unit 17, a piston 18, front and rear taper sockets 20,21, front and rear collet heads 22,23, and a connecting shaft 19.

The mount 12 is disposed within the housing 11, and has an axially-extending hole 121, fluid inlet and outlet ports 122, 123 extending radially, and a fluid passage 124 disposed to permit fluid to flow into a fluid chamber 112 in the housing 11. The valve sleeve 13 is mounted in the axially-extending hole 121 for accommodating the valve unit 15, and has a valve inlet 133 fluidly communicated with the fluid inlet port 122, and a valve outlet 134. The valve unit 15 has a valve seat 152 fluidly communicated with the valve inlet 133, and a spring-loaded ball 154 biased to close the valve seat 152. The bearing unit 16 is disposed in the axially-extending hole 121 at front and rear sides of the valve unit 15. The rotary unit 17 extends axially through the bearing unit 16, and has a fluid duct 171 fluidly communicated with the valve outlet 134. The piston 18 is movably disposed in the rotary unit 17 to be moved away from the fluid duct 171 upon injection of high-pressure hydraulic fluid into the rotary unit 17 through the fluid inlet port 122 and the fluid duct 171. The front and rear taper sockets 20,21 are threadedly fastened to the rotary unit 17 and the piston 18, respectively. The front collet head 22 is movably received in the front taper socket 20. The rear collet head 23 is movably received in the rear taper socket 21, and is coupled to the front collet head 22 by the connecting shaft 19.

Movement of the piston 18 away from the fluid duct 171 results in concurrent actuation of the front and rear collet heads 22,23 through the front and rear taper sockets 20,21 so as to clamp a workpiece between the front and rear collet heads 22,23. However, the following drawbacks arise:

1. Since the spring-loaded ball 154 is mounted to move axially, it tends to disengage from the valve seat 152 by virtue of the centrifugal force during high-speed rotation of the chuck assembly 10, thereby resulting in oil leakage from the valve unit 15 so that the workpiece cannot be clamped reliably by the collet heads 22,23.

2. Since the clearance 14 disposed between the valve sleeve 13 and the mount 12 is relatively small (e.g. 0.03 mm-0.04 mm), and since the valve sleeve 13 and the mount 12 are disposed radially opposite to each other, the valve sleeve 13 and the mount 12 may be in contact with each other during high-speed rotation of the chuck assembly 10 to result in malfunction thereof.

SUMMARY OF THE INVENTION

An object of the present invention is to provide a hydraulic chuck assembly which can reliably clamp a workpiece and which a component from being undesirably impacted by another component during high-speed rotation.

According to this invention, the hydraulic chuck assembly includes a housing, a surrounding mount which is mounted in the accommodation chamber, and which has first and second inlets for respectively introducing therein first and second pressurized fluids, and a front major wall having a circumferential concavity which extends rearward to terminate at an abutment surface, and an annular block which is movably disposed into the circumferential concavity, and which has a front end wall defining inner and outer ring grooves that are disposed to be in fluid communications with the first and second inlets, respectively. A revolving tubular shaft includes a smaller-diameter body segment mounted in the surrounding mount to be rotatable about a spindle axis, and a larger-diameter head segment which is disposed forwardly from the smaller-diameter body segment to form a circumferential shoulder wall. The circumferential shoulder wall has a circumferential docking region which confronts the front end wall of the annular block, and which defines outer and inner ring ports that are configured to mate with the outer and inner ring grooves, respectively, so as to establish fluid communications therebetween, respectively, when the annular block is in a forward position. The larger-diameter head segment defines a cylindrical chamber, and has first and second passages. An annular piston includes a sleeve body insertable into the smaller-diameter body segment, and a head body extending radially and outwardly from the sleeve body so as to partition the cylindrical chamber into front and rear sub-chambers. The front sub-chamber is in fluid communication with the inner ring port through the first passage, while the rear sub-chamber is in fluid communication with the outer ring port through the second passage. The annular piston is axially movable relative to the revolving tubular shaft between a releasing position, where the head body is close to the circumferential shoulder wall, and a tightening position, where the head body is remote from the circumferential shoulder wall. A front taper socket has an inner taper surface, and is disposed to be moved with the annular piston. A front collet head is mated with the inner taper surface such that, when the annular piston is displaced from the releasing position to the tightening position, the front collet head is brought into a firm engagement with a workpiece from a loose engagement therewith. First and second valve units are respectively disposed in the first and second passages, and are configured such that, when the first pressurized fluid entering into the first ring port is admitted by the first valve unit to flow into the front sub-chamber, the annular piston is forced to move towards the releasing position, and such that, when the second pressurized fluid entering into the second ring port is admitted by the second valve unit to flow into the rear sub-chamber, the annular piston is forced to move towards the tightening position. By virtue of the first and second valve units in which balls are confined to be movable along a valve axis that is radial to the spindle axis, the valve seats can be closed firmly to ensure firm engagement of a workpiece with the front collet head.

BRIEF DESCRIPTION OF THE DRAWINGS

Other features and advantages of the present invention will become apparent in the following detailed description of the preferred embodiment of the invention, with reference to the accompanying drawings, in which.

DETAILED DESCRIPTION OF THE PREFERRED EMBODIMENT

Figure 1:
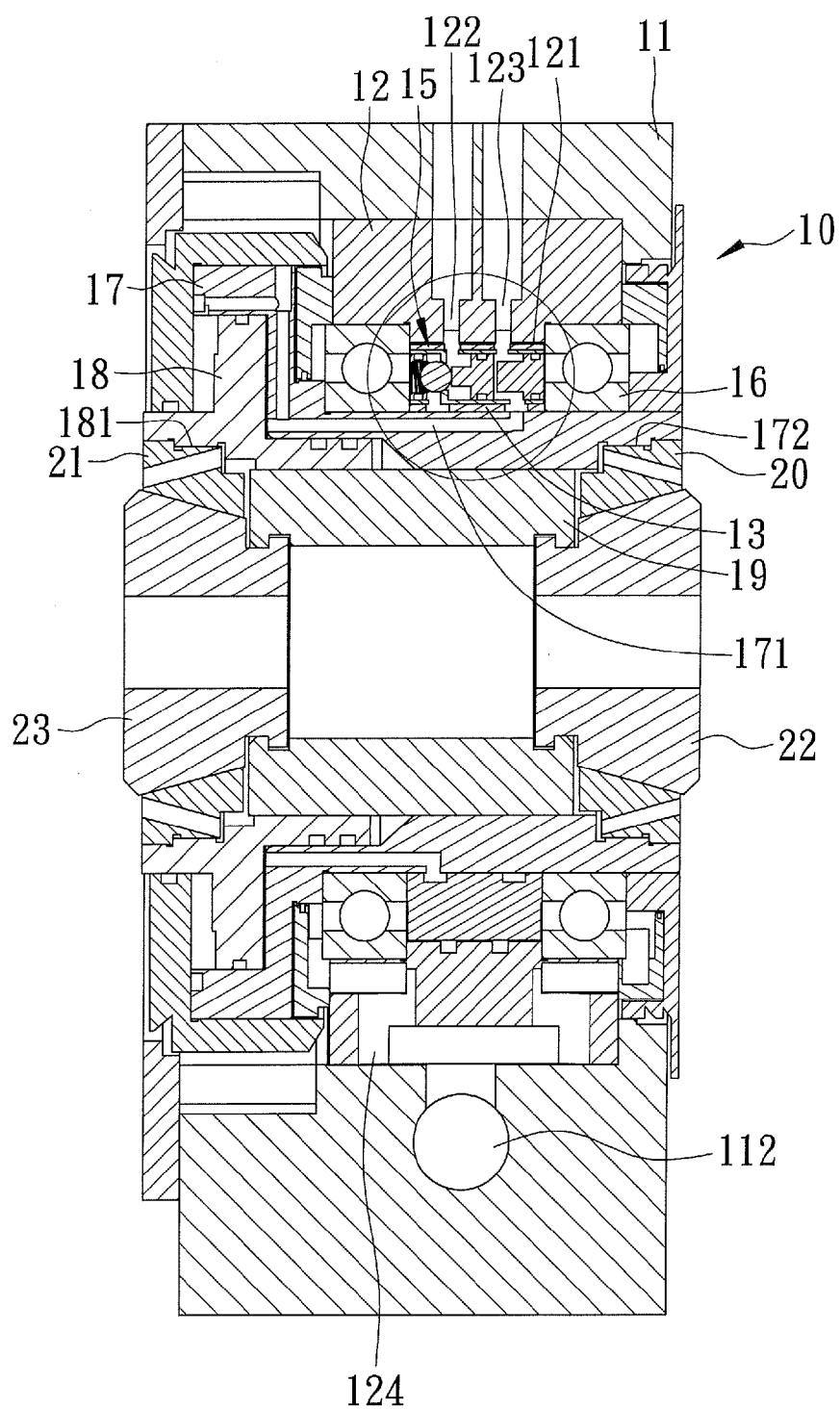
FIG. 1 is a sectional view of a conventional hydraulic chuck assembly disclosed in U.S. Pat. No. 6,668,859.
Figure 2:
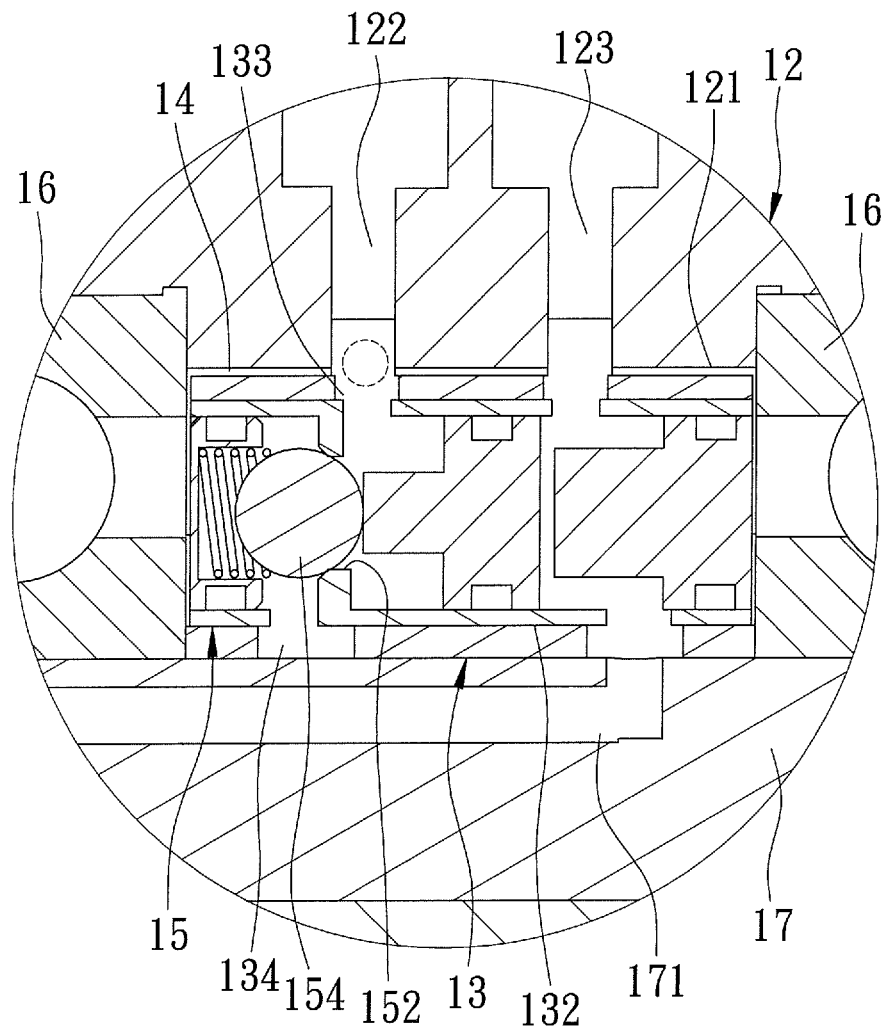
FIG. 2 is an enlarged view of an encircled portion of FIG. 1.
Figure 3:
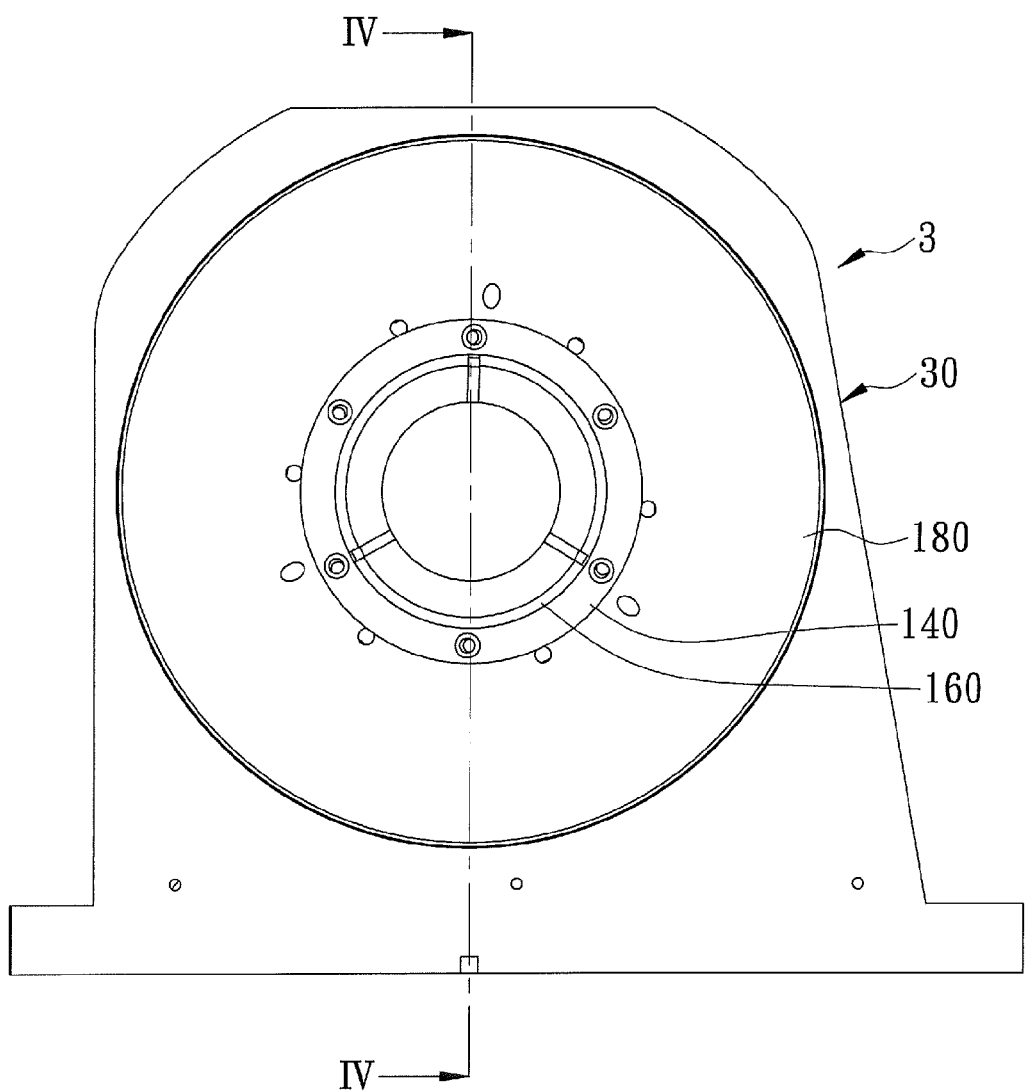
FIG. 3 is a rear view of the preferred embodiment of a hydraulic chuck assembly according to this invention.
Figure 4:
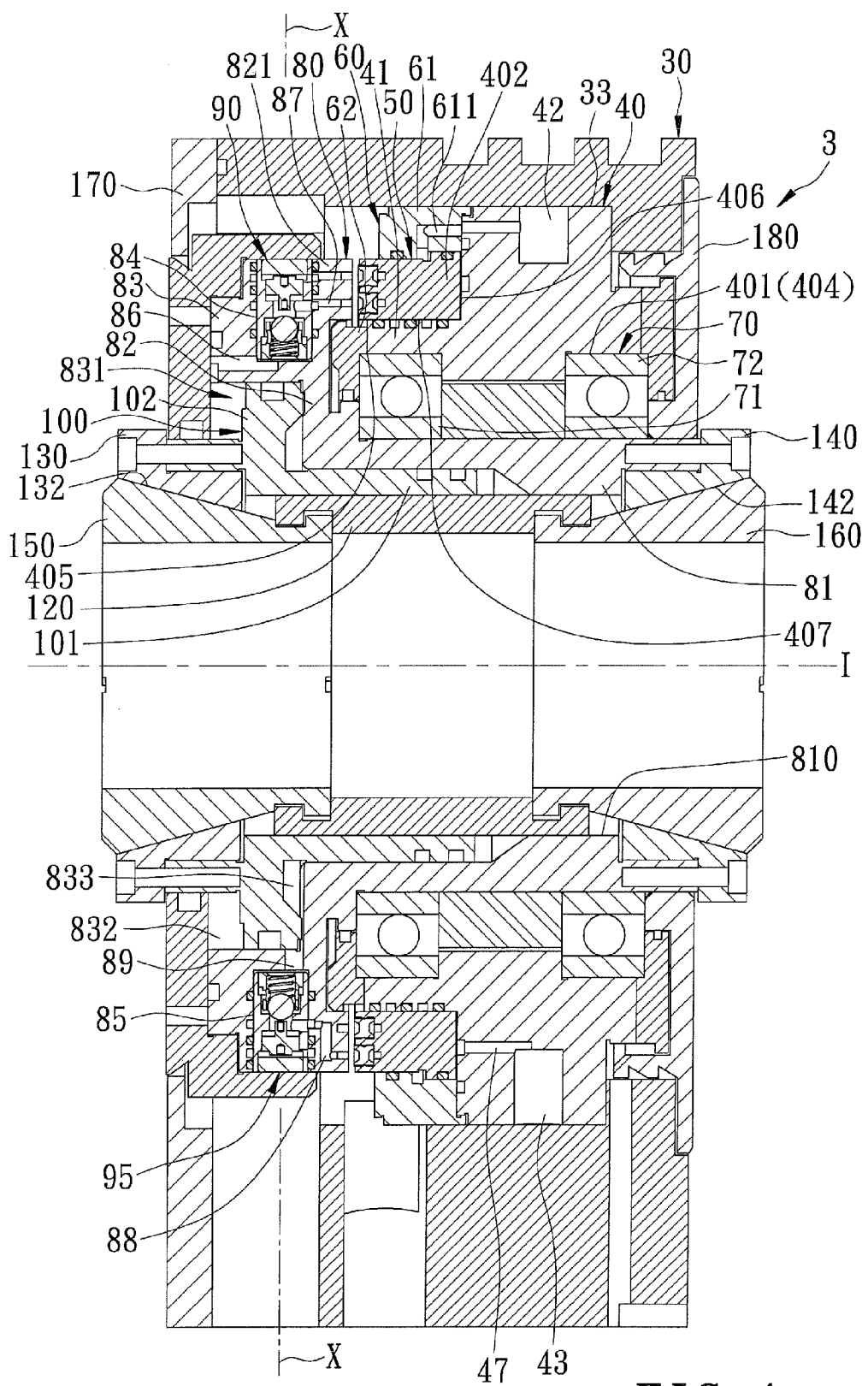
FIG. 4 is a sectional view of the preferred embodiment taken along line IV-IV in FIG. 3.

Referring to FIGS. 3 and 4, the preferred embodiment of a hydraulic chuck assembly 3 according to the present invention is shown to comprise a housing 30, a surrounding mount 40, an annular block 50, an inner positioning unit 60, a bearing unit 70, a revolving tubular shaft 80, an annular piston 100, first and second valve units 90,95, front and rear taper sockets 130,140, front and rear collet heads 150,160, a connecting shaft 120, and front and rear end caps 170,180.

Referring to FIGS. 4 to 7, the housing 30 defines an accommodation chamber 33 surrounding a spindle axis (I). The surrounding mount 40 is mounted in the accommodation chamber 33, and has first and second inlets 44,45 (see FIG. 7) for respectively introducing therein first and second pressurized fluids, and third and fourth inlets 42,43 for respectively introducing therein third and fourth pressurized fluids (see FIG. 4).

The surrounding mount 40 has an inner tubular surface 401 which defines an accommodation space 404, and which extends forwardly to terminate at a front peripheral end 405, and a front major wall 41 which extends radially from the front peripheral end 405, and which has a circumferential concavity 402 which extends rearward to form an inner surrounding surface 407 that surrounds the inner tubular surface 401, and to terminate at an abutment surface 406. Further, the surrounding mount 40 has a first conduit 47 configured to fluidly communicate the fourth inlet 43 with the circumferential concavity 402 through the abutment surface 406.

The annular block 50 is configured to fluid-tightly fit into the circumferential concavity 402, and is movable relative to the abutment surface 406 between forward and backward positions. The annular block 50 has a front end wall 501 which defines inner and outer ring grooves 51,52 that are disposed to be in fluid communications with the first and second inlets 44,45, respectively, by means of channels 48,49 formed in the surrounding mount 40 (see FIG. 7).

The inner positioning unit 60 includes first and second annular shell members 61,62. The first annular shell member 61 is mounted on the surrounding mount 40, and has an outer shell surface 612 radially confronting the housing 30, and an inner shell surface 613 surrounding and spaced apart from the inner surrounding surface of the front major wall 41 to position the annular block 50 into the circumferential concavity 402. Further, the annular shell member 61 has a second conduit 611 configured to fluidly communicate the third inlet 42 with the circumferential concavity 402 through the inner shell surface 613. The bearing unit 70 includes front and rear bearings 71,72 mounted in the accommodation space 404. The second annular shell member 62 is disposed in front of the front bearing 71 and the surrounding mount 40 to guard against axial movement thereof.

Figure 7:
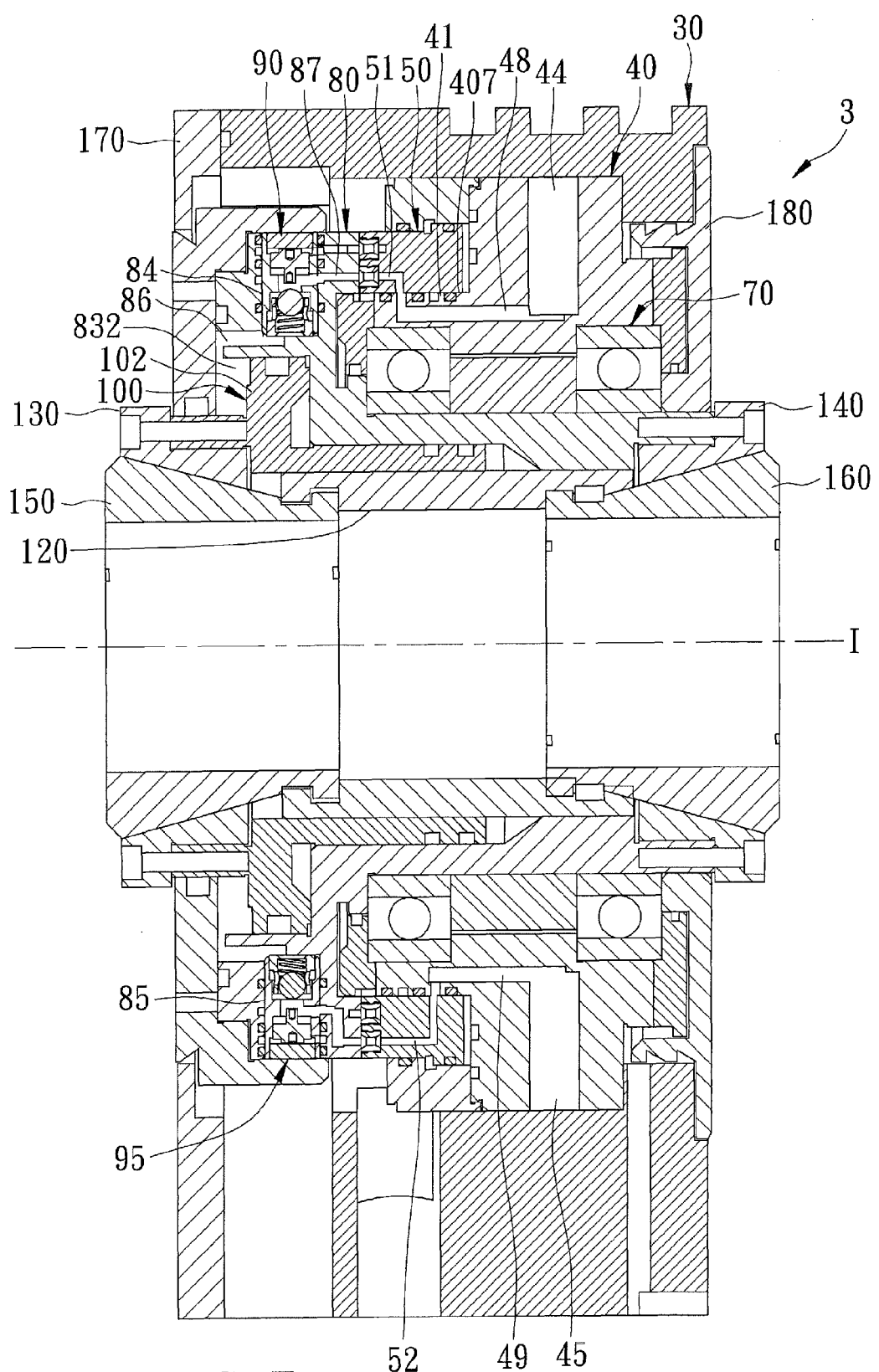
FIG. 7 is a sectional view of the preferred embodiment viewed from another angle.

The revolving tubular shaft 80 includes a smaller-diameter body segment 81 and a larger-diameter head segment 83. The smaller-diameter body segment 81 defines a workpiece receiving space 810, and is mounted in the accommodation space 404 to be rotatable relative to the inner tubular surface 401. The larger-diameter head segment 83 is disposed forwardly from the smaller-diameter body segment 81 to form a circumferential shoulder wall 82. The circumferential shoulder wall 82 has a circumferential docking region 821 which confronts the front end wall 501 of the annular block 50, and which defines outer and inner ring ports 88,87 that are configured to mate with the outer and inner ring grooves 52,51, respectively, so as to establish fluid communications therebetween, respectively, when the annular block 50 is in the forward position, as shown in FIG. 7. The larger-diameter head segment 83 defines a cylindrical chamber 831 surrounding the spindle axis (I), and has first and second passages 84,85.

Figure 8:
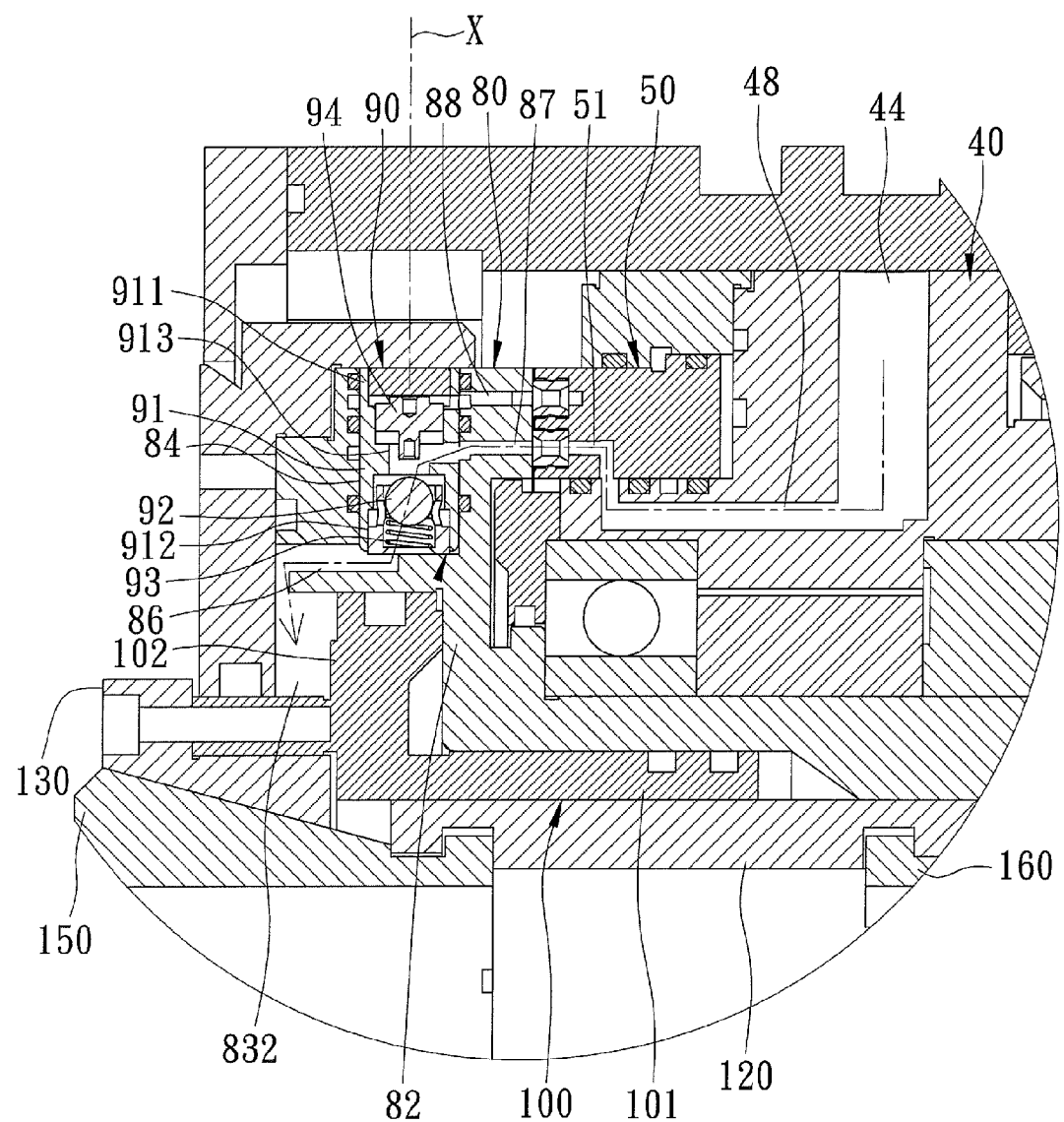
FIG. 8 is an enlarged sectional view of a portion of the preferred embodiment, showing an annular piston in a releasing position.
Figure 9:
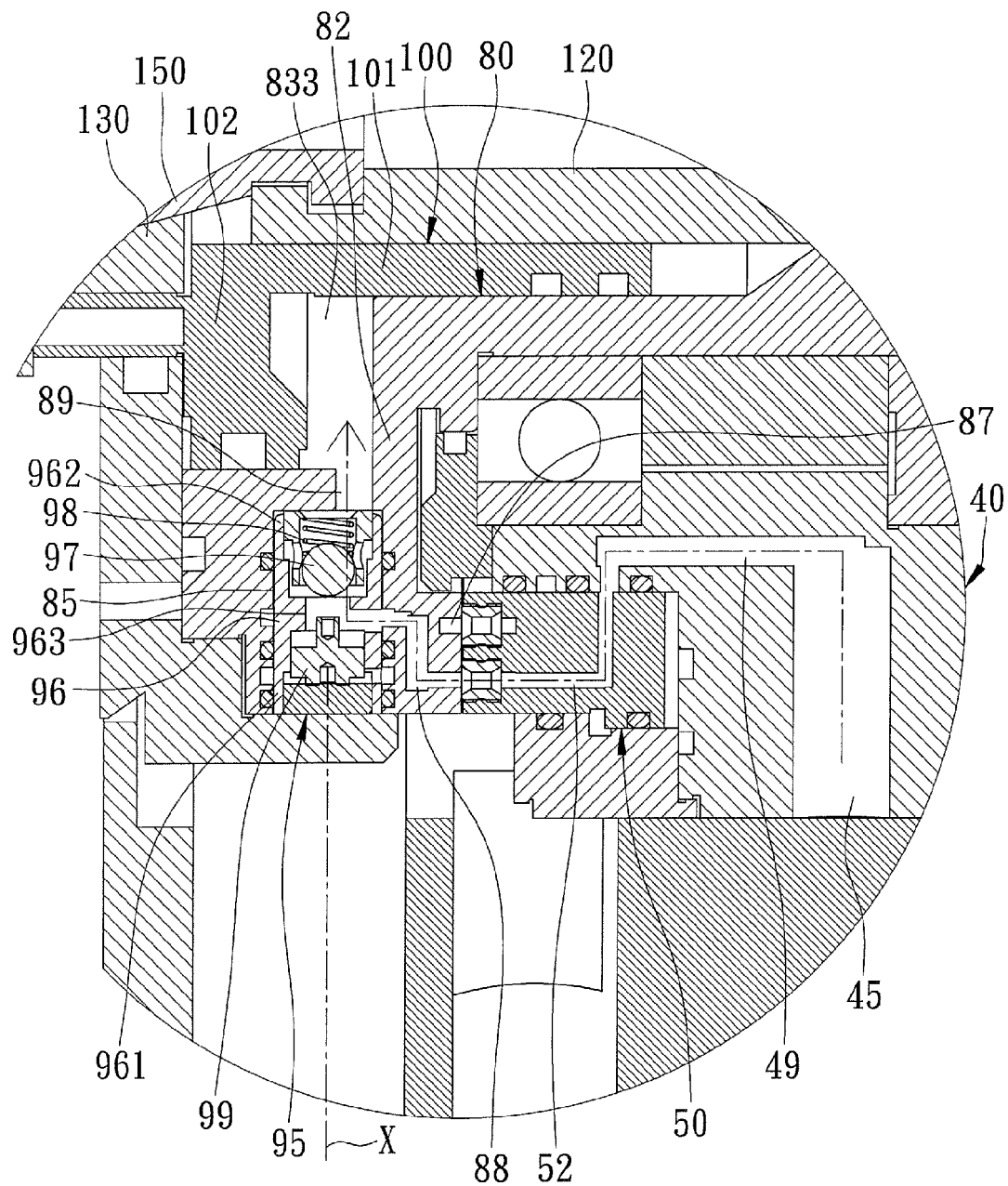
FIG. 9 is an enlarged sectional view of a portion of the preferred embodiment, showing the annular piston in a tightening position.

The annular piston 100 includes a sleeve body 101 and a head body 102. The sleeve body 101 is insertable in the workpiece receiving space 810, and is axially movable relative to the smaller-diameter body segment 81. The head body 102 extends radially and outwardly from the sleeve body 101 to partition the cylindrical chamber 831 into front and rear sub-chambers 832,833. The front sub-chamber 832 is in fluid communication with the inner ring port 87 through the first passage 84 and a channel 86 formed in the larger-diameter head segment 83 (see FIG. 8). The rear sub-chamber 833 is in fluid communication with the outer ring port 88 through the second passage 85 and a channel 89 formed in the larger-diameter head segment 83 (see FIG. 9). The annular piston 100 is disposed to be axially movable relative to the revolving tubular shaft 80 between a releasing position, as shown in FIG. 8, where the head body 102 is close to the circumferential shoulder wall 82, and a tightening position, as shown in FIG. 9, where the head body 102 is remote from the circumferential shoulder wall 82.

As shown in FIGS. 4, 7, 8 and 9, the first and second valve units 90,95 are respectively first and second reversible check valves 90,95. Specifically, each of the first and second reversible check valves 90,95 includes a tubular body 91, 96, a ball 92,97, a biasing spring 93, 98, and a pushing block 94,99.

The tubular body 91,96 is disposed in a corresponding one of the first and second passages 84,85, and has a proximate duct region 911,961 fluidly communicated with a respective one of the outer and inner ring ports 88,87, a distal duct region 912,962 opposite to the proximate duct region 911,961 along a valve axis (X) radial to the spindle axis (I), and a valve seat 913, 963 disposed between the proximate and distal duct regions 911,912; 961,962. The ball 92, 97 is received in the distal duct region 912, 962 of the tubular body 91,96, and is movable along the valve axis (X) to engage the valve seat 913,963, thereby interrupting communication between a corresponding one of the front and rear sub-chambers 832,833 and a corresponding one of the outer and inner ring ports 88,87. The biasing spring 93,98 is disposed in the tubular body 91,96 to bias the ball 92,97 to engage the valve seat 913,963. The push block 94,99 is disposed in the proximate duct region 911,961 of the tubular body 91,96.

The front taper socket 130 has an inner taper surface 132 surrounding the spindle axis (I), and is disposed to be moved forwardly with the annular piston 100. The front collet head 150 is mated with the inner taper surface 132 such that, when the annular piston 100 is displaced from the releasing position to the tightening position, the front collet head 150 is brought into a firm engagement with a workpiece (not shown) from a loose engagement therewith.

The connecting shaft 120 is disposed in the workpiece receiving space 810 and has a front shaft end coupled with the front collet head 150, and a rear shaft end. The rear taper socket 140 is secured to the smaller-diameter body segment 81 of the revolving tubular shaft 80, and has an inner taper surface 142. The rear collet head 160 is coupled with the rear shaft end of the connecting shaft 120 so as to be movable forwardly with the front collet head 150, and is mated with the inner taper surface 142 of the rear taper socket 140 such that, when the front collet head 150 is dragged to move forward by the movement of the annular piston 100 to the tightening position, the rear collet head 160 is pulled forward relative to the rear taper socket 140.

The front and rear end caps 170,180 are disposed to cover front and rear sides of the housing 30.

Figure 10:
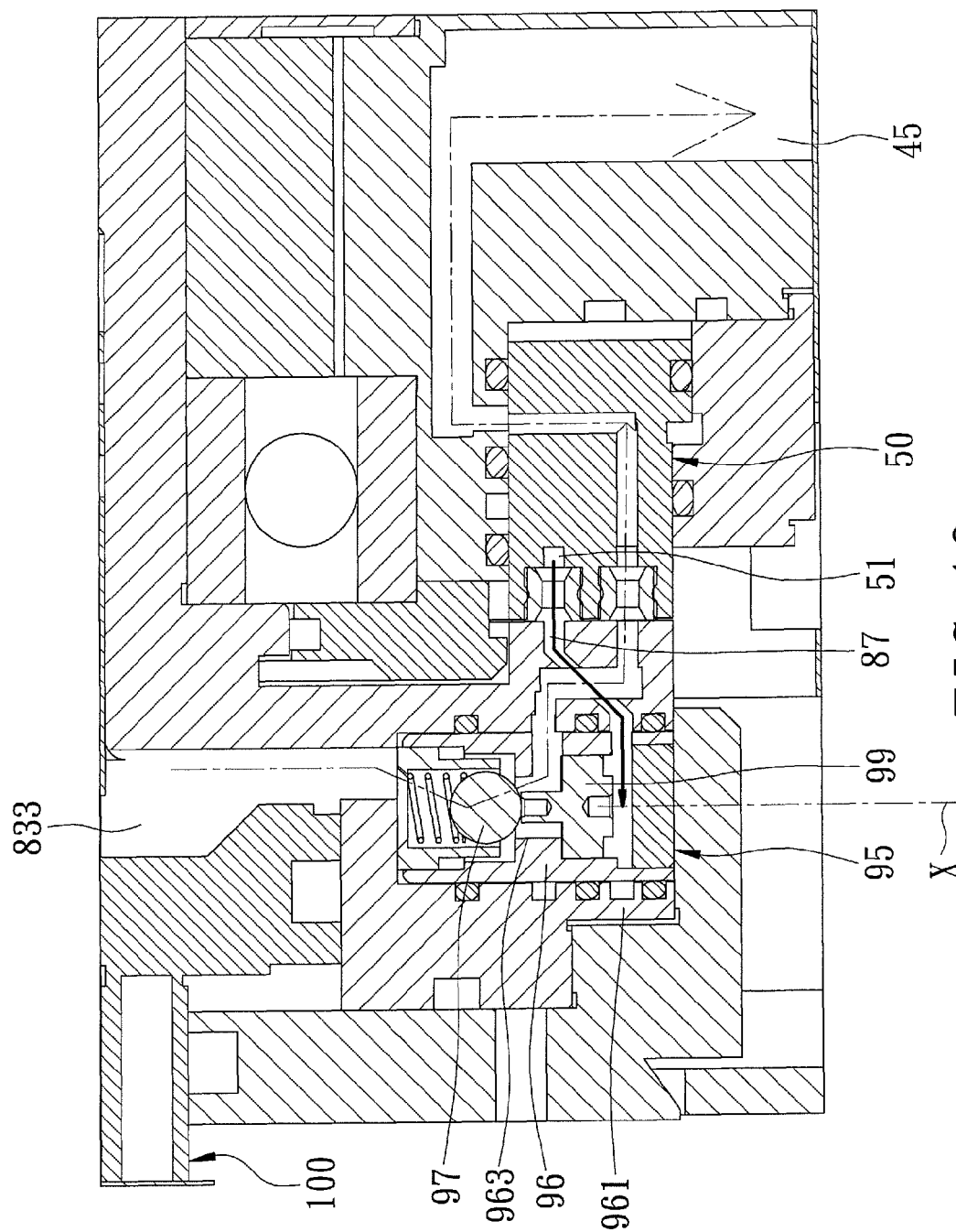
FIG. 10 is an enlarged sectional view of a portion of the preferred embodiment, showing a return-flow of a second pressurized fluid when the annular piston is in the releasing position.

In use, referring to FIGS. 7 and 8, the first pressurized fluid is introduced into the first inlet 44, and subsequently flows in a forward direction (as indicated by dotted line in FIG. 8) through the channel 48, the inner ring groove 51, the inner ring port 87, the tubular body 91 to move the ball 92 away from the valve seat 913, and the channel 86, into the front sub-chamber 832, thereby forcing the annular piston 100 to move rearwards to the releasing position. At this stage, the front and rear collet heads 150,160 are permitted to release a workpiece (not shown). Meanwhile, referring to FIG. 10, the first pressurized fluid further enters into the proximate duct region 961 (as indicated by solid line in FIG. 10) to force the push block 99 to move along the valve axis (X) so as to push the ball 97 away from the valve seat 963. Thus, once the first pressurized fluid entering the front sub-chamber 832 is made higher in pressure than the second pressurized fluid remaining the rear sub-chamber 833, the second pressurized fluid is forced to flow in a backward direction to return to the second inlet 45 (as indicated by dotted line in FIG. 10).

Figure 11:
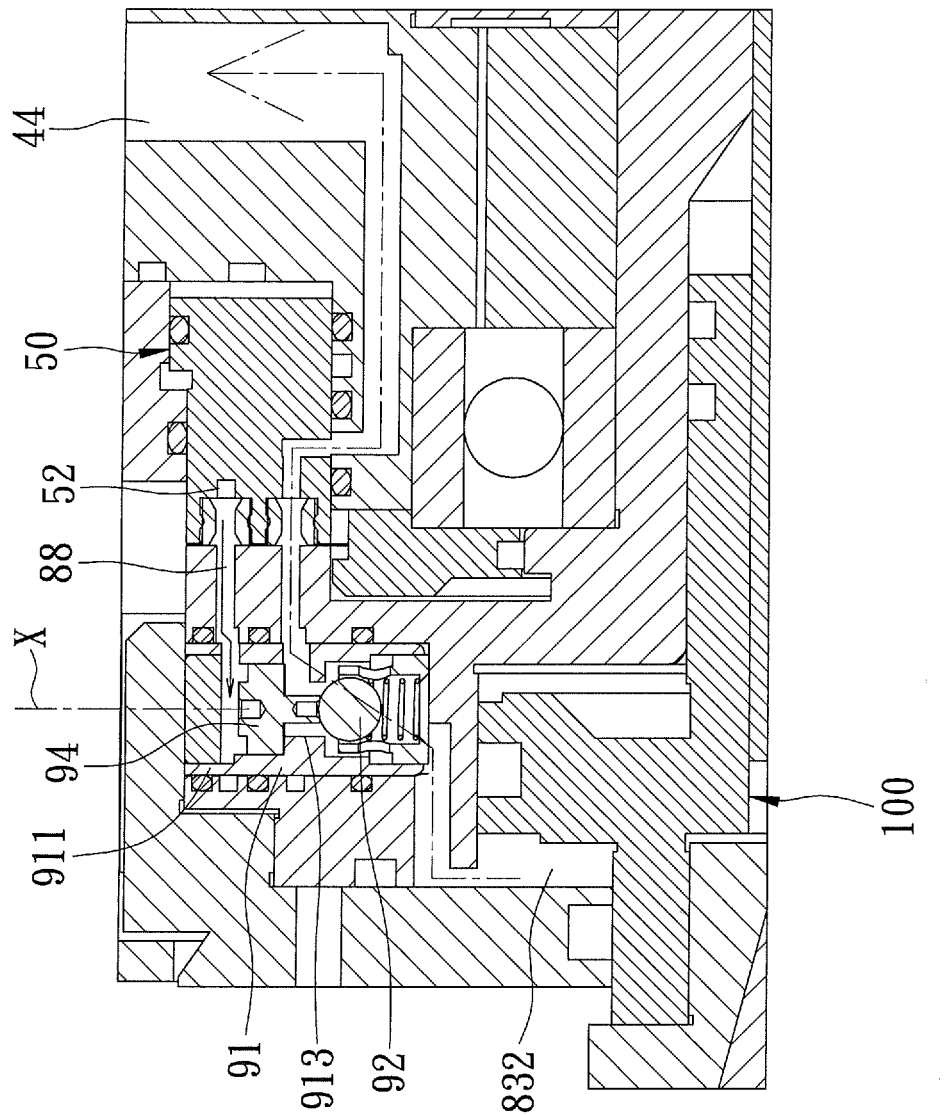
FIG. 11 is an enlarged sectional view of a portion of the preferred embodiment, showing a return-flow of a first pressurized fluid when the annular piston is in the tightening position.

Referring to FIGS. 7 and 9, the second pressurized fluid is introduced into the second inlet 45, and subsequently flows in a forward direction (as indicated by dotted line in FIG. 9) through the channel 49, the outer ring groove 52, the outer ring port 88, the tubular body 96 to move the ball 97 away from the valve seat 963, and the channel 89, into the rear sub-chamber 833, thereby forcing the annular piston 100 to move forwards to the tightening position. At this stage, the front and rear collet heads 150,160 are moved to tighten a workpiece. Meanwhile, referring to FIG. 11, the second pressurized fluid further enters into the proximate duct region 911 (as indicated by solid line in FIG. 11) to force the push block 94 to move along the valve axis (X) so as to push the ball 92 away from the valve seat 913. Thus, once the second pressurized fluid entering the rear sub-chamber 832 is made higher in pressure than the first pressurized fluid remaining the front sub-chamber 832, the first pressurized fluid is forced to flow in a backward direction to return to the first inlet 44 (as indicated by dotted line in FIG. 11).

Figure 5:
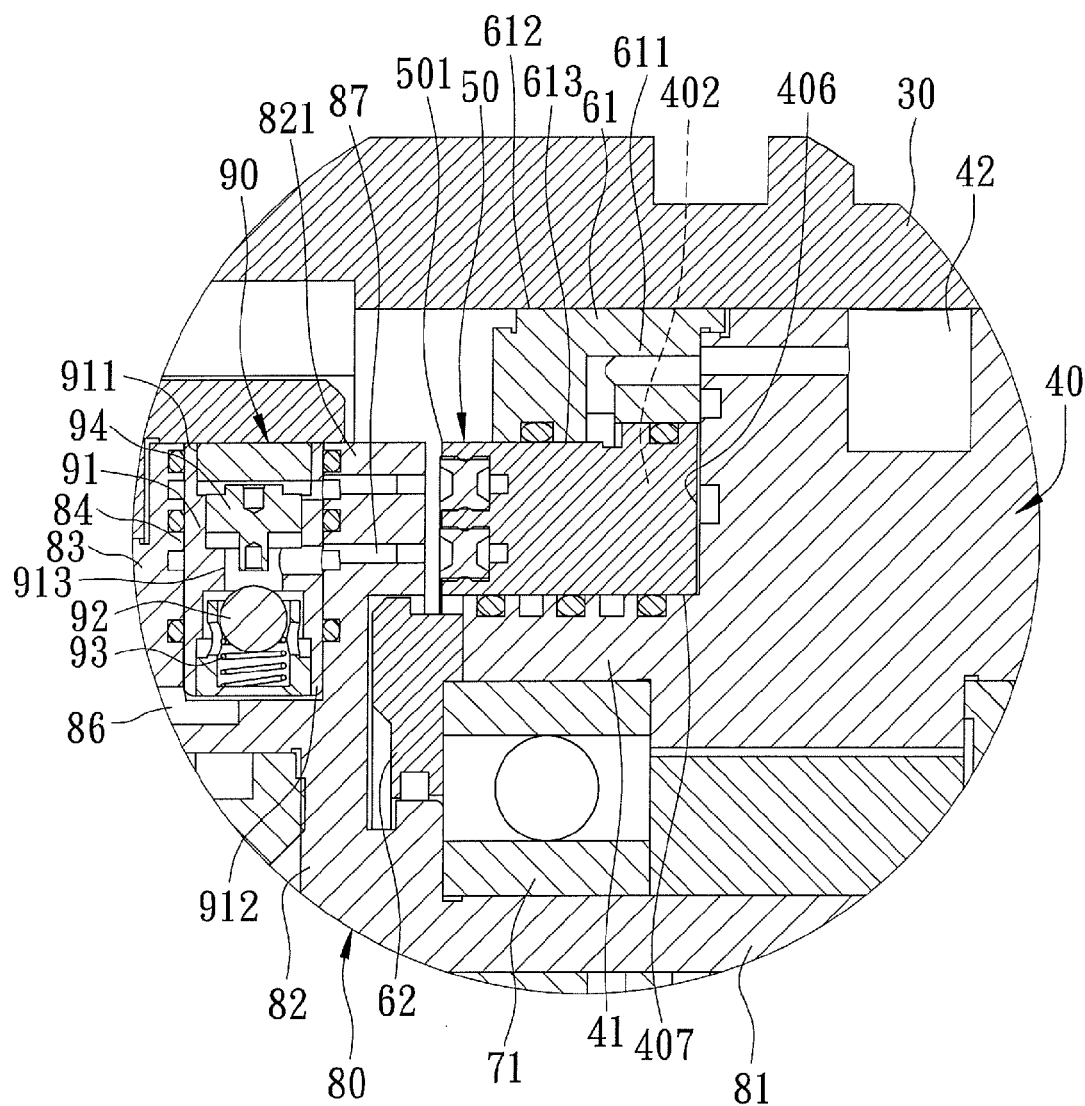
FIG. 5 is an enlarged sectional view of a portion of the preferred embodiment, showing an annular block in a backward position.

Referring to FIGS. 4 and 5, after the workpiece is tightened as mentioned above, the third pressurized fluid is introduced into the third inlet 42, and flows into the circumferential concavity 402 through the second conduit 611 to force the annular block 50 to move to the backward position, where the front end wall 501 is removed from the circumferential docking region 821. Hence, no any pressurized fluid can enter the first valve unit 90, and the ball 92 is pressed by the biasing spring 93 to close the valve seat 913. A constant fluid pressure in the cylindrical chamber 831 is ensured such that the workpiece can be clamped reliably by the front and rear collet heads 150,160.

Figure 6:
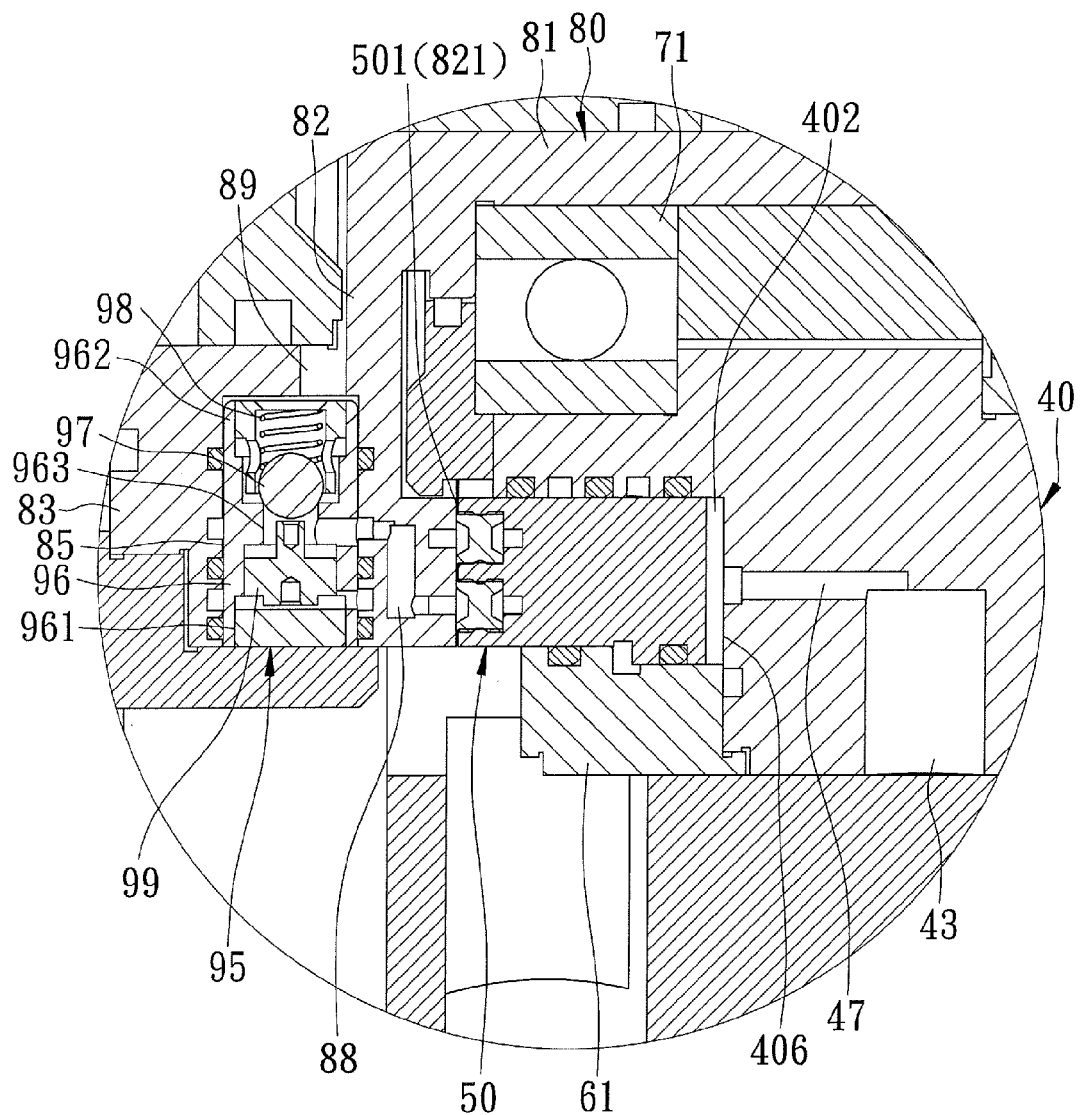
FIG. 6 is an enlarged sectional view of a portion of the preferred embodiment, showing the annular block in a forward position.

Referring to FIGS. 4 and 6, when the fourth pressurized fluid is introduced into the fourth inlet 43, and flows into the circumferential concavity 402 through the first conduit 47, the annular block 50 is forced to move to the forward position, where the front end wall 501 is in engagement with the circumferential docking region 821. At this stage, one of the first and second pressurized fluids is permitted to flow into the respective valve unit 90,95, as illustrated above and in FIG. 7.

Accordingly, since the valve axis (X) of each valve unit 90,95 is radial to the spindle axis (I), by virtue of the centrifugal force during high-speed rotation of the chuck assembly 3, each ball 92,97 can be further forced to abut firmly and tightly against the respective valve seat 913,963, thereby eliminating the problem of oil leakage and ensuring firm engagement of a workpiece with the chuck assembly 3. In addition, the annular block 50 is kept to be spaced apart from the circumferential docking region 821 along the spindle axis (I) during a machining process. Since no closer contact between components respectively of the revolving tubular shaft 80 and the surrounding mount 40 is required other than where the front and rear bearings 71,72 are located, undesired possible impact of components during high-speed rotation can be assuredly prevented.

While the present invention has been described in connection with what is considered the most practical and preferred embodiment, it is understood that this invention is not limited to the disclosed embodiment but is intended to cover various arrangements included within the spirit and scope of the broadest interpretations and equivalent arrangements.

What is claimed is:

1. A hydraulic chuck assembly comprising:
a housing defining an accommodation chamber which surrounds a spindle axis;
a surrounding mount which is mounted in said accommodation chamber, and which has first and second inlets for respectively introducing therein first and second pressurized fluids, said surrounding mount having
an inner tubular surface which defines an accommodation space, and which extends forwardly to terminate at a front peripheral end, and
a front major wall extending radially from said front peripheral end, and having a circumferential concavity which extends rearward to form an inner surrounding surface that surrounds said inner tubular surface, and to terminate at an abutment surface;
an annular block configured to fluid-tightly fit into said circumferential concavity, and disposed to be movable relative to said abutment surface between forward and backward positions, said annular block having a front end wall which defines inner and outer ring grooves that are disposed to be in fluid communications with said first and second inlets, respectively;
a revolving tubular shaft including
a smaller-diameter body segment which defines a workpiece receiving space, and which is mounted in said accommodation space to be rotatable relative to said inner tubular surface, and
a larger-diameter head segment which is disposed forwardly from said smaller-diameter body segment to form a circumferential shoulder wall, said circumferential shoulder wall having a circumferential docking region which confronts said front end wall of said annular block, and which defines outer and inner ring ports that are configured to mate with said outer and inner ring grooves, respectively, so as to establish fluid communications therebetween, respectively, when said annular block is in the forward position, said larger-diameter head segment defining a cylindrical chamber which surrounds the spindle axis, said larger-diameter head segment having first and second passages;

an annular piston including
- a sleeve body which is insertable in said workpiece receiving space, and
- a head body extending radially and outwardly from said sleeve body so as to partition said cylindrical chamber into front and rear sub-chambers, said front sub-chamber being in fluid communication with said inner ring port through said first passage, said rear sub-chamber being in fluid communication with said outer ring port through said second passage,
- said annular piston being disposed to be axially movable relative to said revolving tubular shaft between a releasing position, where said head body is close to said circumferential shoulder wall, and a tightening position, where said head body is remote from said circumferential shoulder wall;

a front taper socket which has an inner taper surface that surrounds the spindle axis, and which is disposed to be moved with said annular piston;

a front collet head mated with said inner taper surface such that, when said annular piston is displaced from the releasing position to the tightening position, said front collet head is brought into a firm engagement with a workpiece from a loose engagement therewith; and first and second valve units which are respectively disposed in said first and second passages, and which are configured such that, when the first pressurized fluid entering into said first ring port is admitted by said first valve unit to flow into said front sub-chamber, said annular piston is forced to move towards the releasing position, and such that, when the second pressurized fluid entering into said second ring port is admitted by said second valve unit to flow into said rear sub-chamber, said annular piston is forced to move towards the tightening position.

2. The hydraulic chuck assembly according to claim 1, wherein said surrounding mount having third and fourth inlets which are disposed for respectively introducing therein third and fourth pressurized fluids, and a first conduit which is configured to fluidly communicate said fourth inlet with said circumferential concavity through said abutment surface such that the introduced fourth pressurized fluid forces said annular block to move toward the forward position;

said hydraulic chuck assembly further comprising an annular shell member mounted on said surrounding mount, and having
- an outer shell surface which radially confronts said housing,
- an inner shell surface which surrounds and which is spaced apart from said inner surrounding surface of said front major wall to define said circumferential concavity, and
- a second conduit which is configured to fluidly communicate said third inlet with said circumferential concavity through said inner shell surface such that the introduced third pressurized fluid forces said annular block to move toward the backward position.

3. The hydraulic chuck assembly according to claim 2, wherein said first and second valve units are respectively first and second reversible check valves such that, when one of the first and second pressurized fluids in said cylindrical chamber is made higher in pressure than the other one by virtue of fluid flowing through a corresponding one of said first and second passages in a forward direction to displace said annular piston to a corresponding one of the releasing and tightening positions, the other one of the first and second pressurized fluid left in a corresponding one of said front and rear sub-chambers is forced to return through said corresponding one of said first and second passages in a backward direction to a corresponding one of said first and second inlets.

4. The hydraulic chuck assembly according to claim 3, wherein each of said first and second reversible check valve units includes
- a tubular body disposed in a corresponding one of said first and second passages, and having a proximate duct region fluidly communicated with a respective one of said outer and inner ring ports, a distal duct region opposite to said proximate duct region along a valve axis radial to the spindle axis, and a valve seat disposed between said proximate and distal duct regions,
- a ball received in said distal duct region, and movable along the valve axis to engage said valve seat, thereby interrupting communication between a corresponding one of said front and rear sub-chambers and a corresponding one of said outer and inner ring ports, and
- a biasing spring disposed in said tubular body to bias said ball to engage said valve seat.

5. The hydraulic chuck assembly according to claim 4, wherein each of said first and second reversible check valve units further includes a push block which is disposed in said proximate duct region and which is forcible to move along the valve axis by a respective one of the second and first pressurized fluids that flows from the corresponding one of said outer and inner ring ports so as to push said ball away from said valve seat, thereby permitting the respective one of the first and second pressurized fluids to flow in the backward direction to return to the respective one of said first and second inlets.

6. The hydraulic chuck assembly according to claim 1, further comprising:
- a connecting shaft which is disposed in said workpiece receiving space and which has a front shaft end coupled with said front collet head, and a rear shaft end;
- a rear taper socket which is secured to said smaller-diameter body segment of said revolving tubular shaft, said rear taper socket having an inner taper surface; and
- a rear collet head which is coupled with said rear shaft end of said connecting shaft so as to be movable with said front collet head, and which is mated with said inner taper surface of said rear taper socket such that, when said front collet head is dragged to move forward by the movement of said annular piston to the tightening position, said rear collet head is pulled forward relative to said rear taper socket.

* * * * *